Feb. 20, 1962 R. F. GARRISON ET AL 3,022,003

COUNTING CIRCUIT

Filed Dec. 19, 1958 2 Sheets-Sheet 1

INVENTORS R. F. GARRISON
F. A. SAAL
BY R. O. Nimtz
ATTORNEY

INVENTORS R. F. GARRISON
F. A. SAAL
BY R. O. Nimz
ATTORNEY

3,022,003
COUNTING CIRCUIT

Richard F. Garrison, Clinton, and Frederick A. Saal, Plainfield, N.J., assignors to Bell Telephone Laboratories, Incorporated, New York, N.Y., a corporation of New York Filed Dec. 19, 1958, Ser. No. 781,755
11 Claims. (Cl. 235—92)

This invention relates to digital data processing and, more particularly, to counting in the binary notation.

Circuits are well known by which a series of pulses are utilized to generate binary numbers in sequence. Such a circuit is known as a binary counter and utilizes a number of bistable devices to translate a serial pulse input into a parallel sequence of output conditions on the bistable devices representative of the various numbers of the binary scale. The output then represents, in binary notation, the number of serial input pulses applied to the circuit up to that time. If the input pulses occur at regular intervals, i.e., have a fixed repetition rate, the counter output is a measure of the time which has elapsed since the beginning of the pulse train. This type of timing information is useful in many circuits to measure the duration of various events.

Such timing information can be advantageously used, for example, to simultaneously time a plurality of overlapping events. Such a timing arrangement is disclosed in the copending application of the present applicant, F. A. Saal, and I. Welber, Serial No. 686,468, filed September 26, 1957, since matured into U.S. Patent 2,935,569, issued May 3, 1960, in connection with the timing of signals in a time assignment speech interpolation (TASI) system. In the copending application of G. N. Packard Serial No. 704,927, filed Dec. 24, 1957, since matured into U.S. Patent 2,957,945, issued October 25, 1960, this timing arrangement is simplified by the use of an adding circuit which adds a fixed number to the binary output numbers and sets the timing interval by the difference between the two sets of binary numbers. In this case, a comparing circuit is used to determine coincidences between the output numbers and the sums generated by the adding circuit, and thus time the desired event.

One difficulty in a timing circuit such as that disclosed in the above-mentioned Packard case is that the number to be added, and hence the duration of the timed interval, cannot be easily changed. The adding circuit, normally made up of logical gating circuits, must be replaced entirely in order to vary the timing interval.

Another disadvantage of this arrangement lies in the delay inherent in such a logic circuit which delays the appearance of the generated sums and hence represents an error in the timing. Furthermore, these delays result in the generation of spurious pulses which may cause erroneous responses.

It is an object of the present invention to increase the accuracy and versatility of a timing circuit relying on the regular generation of binary numbers.

It is another object of the invention to simultaneously time a plurality of overlapping events and to rapidly change the duration of the timed intervals.

It is a more specific object of the invention to simultaneously generate each of a first sequence of binary numbers with a respective one of a second sequence of binary numbers selectively advanced with respect to the first sequence.

In accordance with the present invention a so-called "fast carry" binary counter is utilized to simultaneously generate all of the digits of each of a first sequence of binary numbers. Circuitry is also provided for simultaneously generating all of the digits of each of a second sequence of binary numbers selectively advanced with respect to the first sequence, i.e., the output of the binary counter. That is, a bank of coincidence gates is utilized to "preset" a number of bistable devices from the selectively inverted outputs of the binary counter. An advance pulse will then simultaneously change the states of the required ones of the bistable devices in accordance with the preset pattern. The output conditions on these bistable devices then represent the sums of the counter output number and the binary number represented by the selective inversion of the counter output conditions.

It will be noted that the counter output digits and the advanced output digits will appear simultaneously in the counter output conductors and the bistable device output conductors, respectively. The lack of any delay between these two outputs makes possible a higher degree of accuracy in the basic timing information than was heretofore possible. Furthermore, since the difference between the two outputs is dependent merely upon the selective inversion of the counter outputs applied to the coincidence gates, this difference may be easily and rapidly varied by electronically controlling this inversion. In this way, the timing interval may be varied at will or can be made to vary automatically in response to a prepared program.

These and other objects and features, the nature of the present invention and its various advantages, will be more readily understood by consideration of the attached drawings and of the following detailed description of these drawings.

Figure 1:
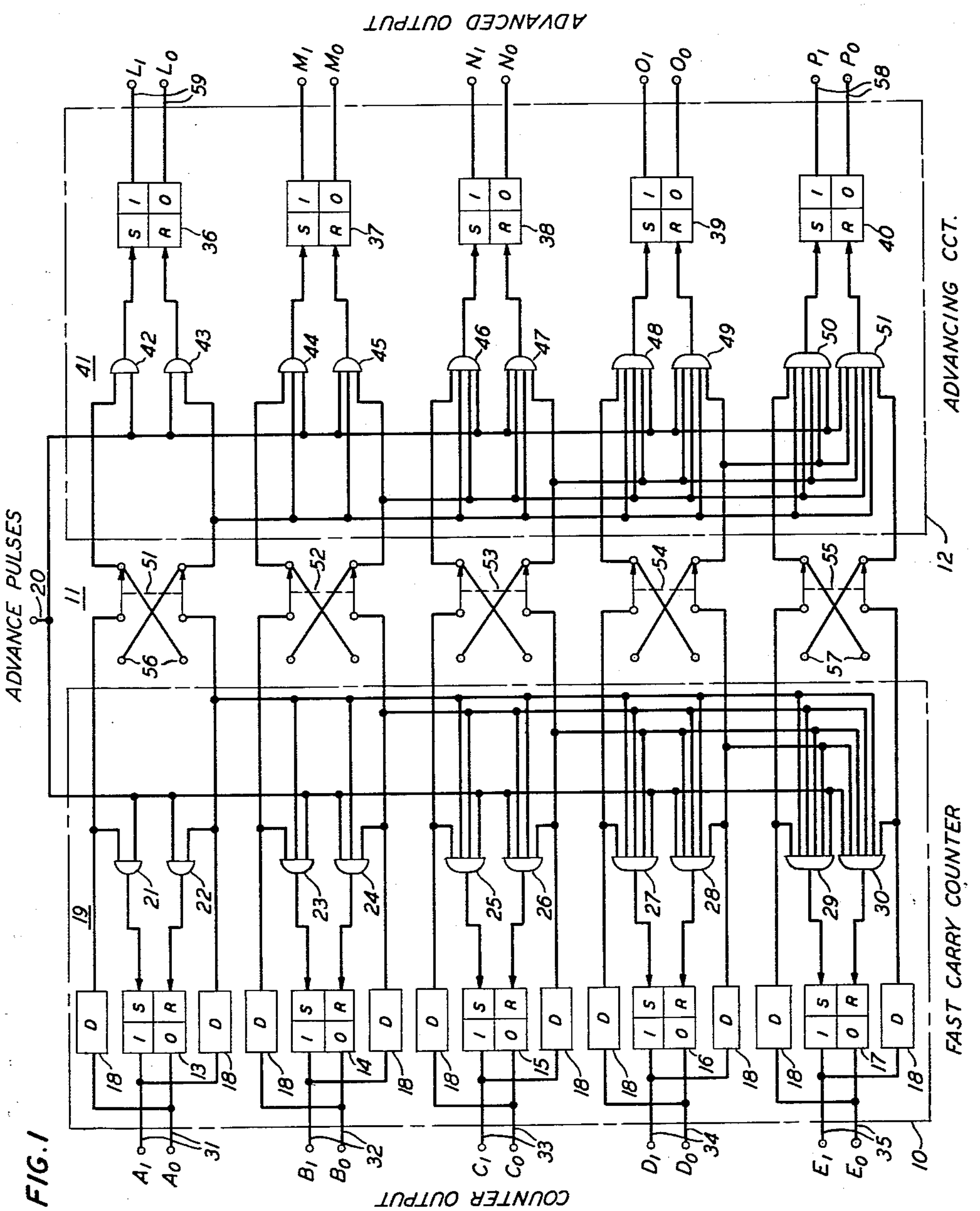
FIG. 1 is a schematic representation of a binary advancing circuit in accordance with the present invention.

Referring more particularly to FIG. 1, there is shown a count advancing circuit in accordance with the present invention comprising "a fast carry" counter 10, an inverting circuit 11 and an advancing circuit 12. Counter circuit 10 is of a type well known in the art which comprises a plurality of bistable devices 13 through 17 each being capable of remaining in either of two stable states. A first input, applied to the portion of the device labeled "S," sets the bistable device in a first one of these two states. A second input, applied to the portion of the device labeled "R," resets the bistable device in the other of the two stable states. When in the first stable state, the bistable device produces an output of a first kind, for example, a positive voltage, on the output terminal labeled "1" and produces an output of a second kind, for example, zero volt, on the other output terminal, labeled "0". Similarly, when the bistable device is in the other stable state an output of the first kind is produced on the "0" output terminal and an output of the second kind is produced on the "1" output terminal.

In many types of counting circuits it is desirable that all of the output digits appear simultaneously. A counting circuit having a plurality of bistable devices connected in cascade, for example, will normally require a finite amount of time for carry digits to propagate from the first device through to the last device. During this "carry propagation" interval the output digits will change successively on the various bistable devices. Hence, during this interval, there will be an ambiguity as to which binary number is actually being produced by the counter. In many applications such an ambiguity cannot be tolerated.

In order to remove this type of ambiguity, the fast carry counter is arranged to produce all output digits simultaneously. To this end, each of the outputs of bistable devices 13 through 17 is brought back through a delay circuit 18 to a bank 19 of coincidence gates. These coincidence gates are of the type having a plurality of inputs and a single output which is energized only when all of the inputs are simultaneously energized. Such gates are well known to the art and are variously known as "coincidence" gates, "AND" gates or "exclusive AND" gates. The purpose of the gates of bank 19 is to preset the inputs to bistable devices 13 through 17 such that the next pulse appearing on advance pulse conductor 20 will simultaneously change the state of all of the required ones of bistable devices 13 through 17 to form the next number of the binary sequence.

Thus, coincidence gate 21 is preset by the "0" output of bistable device 13 such that each time device 13 is in the "0" state, the next advance pulse on conductor 20 will switch it to the "1" state. Similarly, coincidence gate 22 is preset by the "1" output of device 13 such that each time device 13 is in the "1" state, the next advance pulse on conductor 20 will serve to reset it to the "0" state. Coincidence gate 23 presets bistable device 14 such that device 14 will be set to the "1" state only if it is already in the "0" state and also provided that the device 13 is in the "1" state. Coincidence gate 24 serves to reset device 14 only when device 14 is already in the "1" state and device 13 is also in the "1" state. Similarly, coincidence gates 25 through 30 serve to preset the inputs to bistable devices 15 through 17 in accordance with a simple program readily apparent from the following table of the binary codes to be produced. The equivalent decimal numbers are shown in parentheses immediately following the binary numbers.

*Table*

| E | D | C | B | A | |
|---|---|---|---|---|---|
| 0 | 0 | 0 | 0 | 0 | (0) |
| 0 | 0 | 0 | 0 | 1 | (1) |
| 0 | 0 | 0 | 1 | 0 | (2) |
| 0 | 0 | 0 | 1 | 1 | (3) |
| 0 | 0 | 1 | 0 | 0 | (4) |
| (*) | (*) | (*) | (*) | (*) | (*) |
| 0 | 1 | 1 | 1 | 1 | (15) |
| 1 | 0 | 0 | 0 | 0 | (16) |
| 1 | 0 | 0 | 0 | 1 | (17) |
| 1 | 0 | 0 | 1 | 0 | (18) |
| 1 | 0 | 0 | 1 | 1 | (19) |
| 1 | 0 | 1 | 0 | 0 | (20) |
| (*) | (*) | (*) | (*) | (*) | (*) |
| 1 | 1 | 1 | 0 | 0 | (28) |
| 1 | 1 | 1 | 0 | 1 | (29) |
| 1 | 1 | 1 | 1 | 0 | (30) |
| 1 | 1 | 1 | 1 | 1 | (31) |
| 0 | 0 | 0 | 0 | 0 | (0) |

It can be seen from the table that the least significant digits, appearing in column A, alternate their values with each new binary number produced. The second least significant digits, shown in column B in the table, change to a "1" only when the least significant digit of the preceding number is a "1" and similarly change to a "0" only when the least significant digit of the preceding number is a "1." The next least significant digits, represented by column C, change only when the two digits of lesser significance in the preceding number are "1's." It can be easily ascertained that the two digits of higher significance, represented by columns D and E, also change only when all of the digits of lesser significance are "1's" in the preceding number of the table.

Bank 19 of gates 13 through 17 in FIG. 1 mechanizes this program by providing a coincidence gate for each of the inputs to bistable devices 13 through 17. Each such gate has as an input the "1" output condition of all preceding bistable devices, i.e., the "1" output of all digits of lesser significance. From this it can be seen that all the digits appearing on output conductors 31 through 35 appear simultaneously upon the application of successive advance pulses to conductor 20. The least significant digit of these numbers appears on output conductors 31 and the most significant appears on output conductors 35.

For convenience, each digit has been represented by inverse conditions on two output conductors. It is apparent, however, that the condition on a single output conductor would be sufficient to represent each of the binary digits, in which case the "0" output of each of the bistable devices 13 through 17 would be unnecessary.

The amount of delay provided by delay circuits 18 is something less than the period between successive advance pulses applied to conductor 20 but greater than the width of the advance pulses. The purpose of this delay is to insure that the preceding advance pulse has completely terminated prior to the application of the presetting voltages to the coincidence gates 21 through 30 of bank 19. This insures that the same advance pulse which produces a first binary number on the output conductors 31 through 35 does not also serve to produce the next succeeding number due to the immediate change in the presetting voltages. If the advance pulses are narrow enough, and if bistable devices 13 through 17 have a sufficient amount of inherent switching delay, delay circuits 18 will be unnecessary.

From the above it can be seen that counter 10 serves to simultaneously produce all of the digits of a binary number on output conductors 31 through 35. Furthermore, binary numbers are produced on these output conductors in regular sequence in response to advance pulses and in accordance with the conventional binary code. No delay is involved in propagating carry digits because the condition of the bistable devices 13 through 17 is determined by the presetting voltages representing the immediately preceding binary number. It is therefore unnecessary to propagate carry digits from the least significant digit through to the most significant digit. Counters of this type are well known in the art and have been used for a great many purposes. One counter of this general type, for example, is disclosed in the copending application of H. A. Schneider, Serial No. 593,292, filed June 22, 1956, since matured into U.S. Patent 2,962,212, issued November 29, 1960.

Proceeding to another portion of FIG. 1 there is shown an advance circuit 12 including bistable devices 36 through 40 and another bank 41 of coincidence gates 41 through 51. Bank 41 is similar to bank 19 in that a coincidence gate is provided for each of the inputs to bistable devices 36 through 40 and the inputs to these gates are equal in number to the inputs to the corresponding one of gates 21 through 30. In fact, advancing circuit 12 is identical to counter circuit 10 except for the presetting feedback voltages derived by way of delay circuits 18. The presetting voltages from counting circuit 10 are applied by way of a bank 11 of reversing switches 51 through 55 to the corresponding ones of coincidence gates 42 through 51. It is immediately apparent that with switches 51 through 55 in the positions illustrated, the outputs of bistable devices 36 through 40 will duplicate the outputs of bistable devices 13 through 17.

In accordance with the present invention, means are provided to selectively invert the presetting voltages applied to bank 41 of coincidence gates 42 through 51. Thus, switch 51 serves to invert the presetting voltages derived from the output of bistable device 13. Similarly, switch 52 inverts the output of device 14, switch 53 the output of device 15, switch 54 the output of device 16 and switch 55 the output of device 17. If the switches 51 through 55 are taken as representative of the digits of a binary number, their selective inversion of the presetting voltages may be taken as representative of a binary number which will be called the advancing number. That is, the throwing of switch 51 to contacts 56 will represent a "1" in the least significant digit position of this binary advancing number and the throwing of switch 55 to contacts 57 will represent a "1" in the most significant digit position of the advancing number. In this way, the switches 51 through 55 can be used to set up any binary number within the scale of counter 10.

The effect of reversing any one of the switches 51 through 55 can be readily understood by considering a few examples. If switch 55 is thrown to contacts 57, for example, representing a "1" in the most significant digit position of the advancing number, the only effect on the output of advancing circuit 12 will be to invert the most significant digit of the number appearing on output conductors 58. This corresponds, of course, to an advancement of the output number from circuit 12 with respect to the output of counter 10 by a number equal to the value of the most significant digit of the advancing number. If switch 51 is thrown to contacts 56, representing a "1" in the least significant digit position of the advancing number, the effect will be to invert the output condition on conductors 59 with respect to the conditions on conductors 31 and, furthermore, to preset the succeeding bistable devices 37 through 40 only when device 13 is in the "0" condition. It can be easily ascertained that the ultimate effect of this inversion is to advance the output of circuit 12 with respect to the output of counter 10 by a number equal to the value of the least significant digit of the advancing number. Furthermore, it can be shown that the inversion of the presetting voltages by any one of switches 51 through 55 will have the effect of advancing the output of circuit 12 with respect to counter 10 by a number corresponding to the significance of the digit represented by the switch thrown. Indeed, any combination of switches 51 through 55 may be thrown to advance the output of circuit 12 with respect to the output of counter 10 by the number which this combination of switches represents.

It can therefore be seen that the circuit of FIG. 1 serves to produce two sequences of binary numbers. The first sequence, delivered by counting circuit 10, represents a regular sequence of binary numbers in the conventional binary code. The second sequence of numbers, appearing on the outputs of advancing circuit 12, is also a regular sequence of binary numbers in accordance with the conventional binary code, but is advanced with respect to the counter output by the advancing number which is set up by switches 51 through 55. The outputs from counter 10 and from advancing circuit 12 appear simultaneously upon the application of an advance pulse but always with this constant difference. This difference, moreover, may be easily varied by the selective operation of switches 51 through 55. An advancing circuit of the type shown in FIG. 1 may be used for many purposes only one of which will be described.

Figures 2, 3:
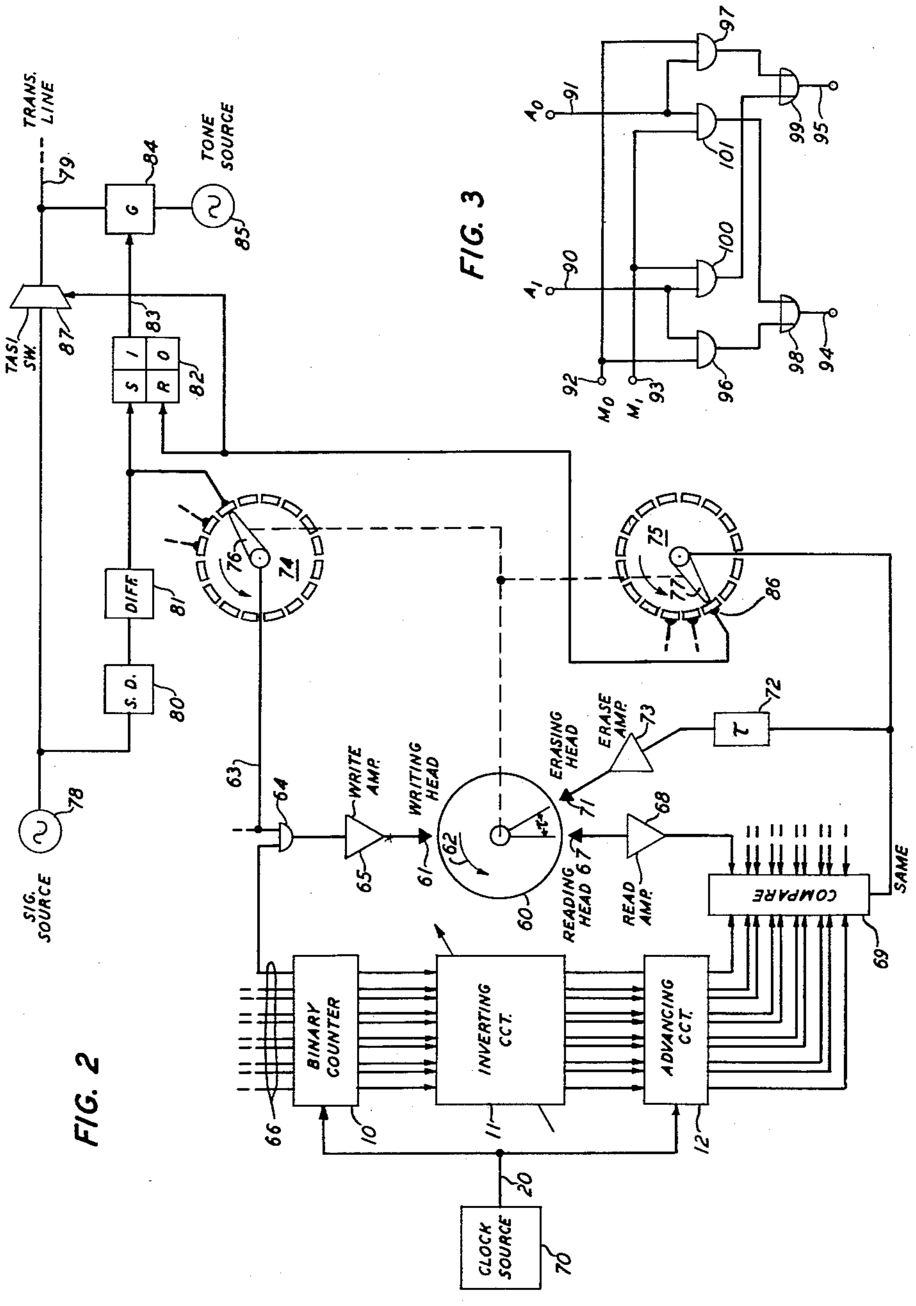
FIG. 2 is a block diagram illustrating the manner in which an advancing circuit such as that shown in FIG. 1 may be used to time a plurality of operations.
FIG. 3 is a schematic drawing of an inverting circuit which can be used to modify the advancing circuit of FIG. 1.

Referring now to FIG. 2, there is shown a circuit for timing the connection signals in a time assignment speech interpolation (TASI) system. A magnetic drum 60 is provided as a storage mechanism for storing the digits of a plurality of binary numbers. In the example illustrated, five-digit binary numbers are stored on the surface of drum 60 by means of writing heads such as writing head 61 which alter the condition of remanent magnetization of the surface of drum 60 immediately below the writing head. For convenience, only one such writing head has been illustrated. Drum 60 rotates in the direction of arrow 62 carrying the drum surface past writing head 61. In order to store a binary digit such as, for example, one derived from binary counter 10, lead 63 to coincidence gate 64 is energized, thus providing an output to write amplifier 65. The output of amplifier 65 is applied to writing head 61 and causes the magnetic condition of the surface of drum 60 immediately adjacent thereto to change state and thus store the binary digit. A plurality of AND gates similar to AND gate 64 are provided, one for each of the output conductors 66 of binary counter 10. One input to each of these gates is derived from conductor 63. In this way a single pulse on lead 63 may be used to write the entire binary number on a longitudinal segment (perpendicular to the plane of the drawing) of drum 60.

Diametrically opposite writing head 61 is a reading head 67 which is arranged to sense the magnetic condition of the surface of drum 60 and thus detect the value of the binary digit stored thereon. The signal thus detected is applied to read amplifier 68 and thence to a compare circuit 69. A compare circuit suitable for the present application is disclosed in the aforementioned copending application of G. N. Packard. There are also provided reading heads and amplifiers for each of the other digits originally stored on the surface of drum 60. The signals derived from these reading heads are each applied to one of the right-hand inputs to compare circuit 69. The left-hand inputs to compare circuit 69 are derived from an advancing circuit 12 similar to the advancing circuit illustrated in FIG. 1. In fact, binary counter 10, inverting circuit 11 and advancing circuit 12 may be identical to those illustrated in FIG. 1. Advance pulses from a clock source 70 are applied by way of lead 20 to binary counter 10 and advancing circuit 12.

An erasing head 71 is displaced from reading head 67 so as to provide a delay $\tau$ between the reading and erasing operations. The output of compare circuit 69, which indicates the identity of the two inputs, is applied to the serial combination of a delay line 72, erasing amplifier 73 and erasing head 71. It can be seen that when a binary number is read from the surface of drum 60 which is identical to the output of advancing circuit 12, compare circuit 69 produces an output. This output is applied to erasing head 71 by way of delay line 72 and amplifier 73 so as to erase the binary number which has produced this identity.

Two commutators 74 and 75 are provided each of which rotates at the same speed and in synchronism with drum 60. That is, brush 76 of commutator 74 passes the segments of commutator 74 at the same speed that the surface of drum 60 passes writing head 61. Furthermore, each of the segments of commutator 74 corresponds to a unique digit storage position on the periphery of drum 60. Similiarly, brush 77 passes over the segments of commutator 75 at the same rate that the surface of drum 60 passes reading head 67. Furthermore, each segment of commutator 75 also corresponds to a unique digit storage position on the periphery of drum 60.

It will be first noted that signals applied to each of the segments of commutator 74 represent the start signal of one of the operations to be timed. Similarly, each of the signals delivered by way of brush 77 to the segments of commutator 75 represent the termination of the time interval. It is apparent that there must then be a one-for-one correspondence beween the segments of commutator 74 and those of commutator 75. That is, each operation to be controlled provides an input to one segment of commutator 74 when the operation is to be initiated and is terminated by a signal delivered to the corresponding segment of commutator 75.

For the purposes of illustration, the timing circuit of FIG. 2 has been disclosed in connection with a time assignment speech interpolation system. In such a system, the usefulness of a transmission line is increased by connecting a signal source to the line only when the signal source is active. Other signal sources may then share this line during idle periods of the first signal source and thereby increase the transmission efficiency of the line.

Thus, signal source 78 is connected to transmission line 79 only while signals are actually being generated. To indicate that this signal source is to be connected, it is now necessary to precede the intelligence signals by an identification tone which indicates to the remote end of the transmission line that the signal source is about to be connected. Such identification tones must be sustained for a minimum interval to insure error-free detection. If the duration of this identification tone becomes excessive, however, the initial loss of the intelligence signal itself may become intolerable. For these reasons, it is desirable that the identification tone be sustained for a closely timed interval. Such is the purpose of the circuits in FIG. 2.

When signal source 78 becomes active, a signal detector 80 detects this fact and applies a signal to differentiating circuit 81. Circuit 81 derives a sharp pulse from this signal and applies this pulse simultaneously to the set input of a bistable device 82 and to one of the segments of commutator 74. When thus set, bistable device 82 produces an output on lead 83 to enable gate 84 and connect identifying tone source 85 to transmission line 79. In this way, transmission of the identification tone is begun.

The pulse applied to commutator 74 is picked up by brush 76 and applied by way of lead 63 to the bank of AND gates similar to gate 64. The enablement of these gates serves to write the binary number then appearing on output conductors 66 of counter 10 on the surface of drum 60. These binary numbers, meanwhile, are advanced by way of inverting circuit 11 and advancing circuit 12 such that the numbers appearing on the output of circuit 12 are advanced by a given amount with respect to the output of counter 10. The means by which this is accomplished has been described in detail with respect to FIG. 1.

The binary number thus stored on drum 60 is read out by reading heads, similar to head 67, on each revolution of drum 60 and applied to compare circuit 69. Compare circuit 69 produces an output only when the two binary input numbers are identical. It can be seen that this will not occur until counter 10 has advanced through the binary sequence to a number which is less than the number stored by an amount equal to the advancing number. If it is assumed that clock source 70 produces pulses with a repetition rate of $k$ pulses per second, then the time elapsing before this interval occurs is given by $$T=\frac{1}{k}(2^n-M)$$

where T is the time interval, $n$ is the number of digits in the binary code and M is the advancing number. For example, if $k$ is 2,000 pulses per second, M is 7 and $n$ is 5, as illustrated, the timed interval is equal to 12.5 milliseconds.

The interval T may be changed in an obvious fashion by altering the repetition rate $k$ of clock source 70 or the advancing number M, as determined by inverting circuit 11. Indeed, any timing interval between "0" and $2^n/k$ seconds, at $1/k$ second steps, may be provided.

The output of compare circuit 69 is applied as heretofore described through delay line 72, erase amplifier 73 to erasing head 71 to erase the number stored on the surface of drum 60. The output of compare circuit 69 is simultaneously applied to brush 77 of commutator 75. Provided commutator 75 is in proper synchronism with drum 60, this signal will be applied to segment 86.

This signal is then used to reset bistable device 82, thus removing the output from lead 83 and disabling gate 84. In this way the identification tone is terminated after the proper time interval. The output from commutator segment 86 is also applied to TASI switch 87 which serves to connect signal source 78 to transmission line 79. In this way, the signals from source 78 will be transmitted on line 79 immediately following the identification tone.

It is to be noted that each of the segments of commutator 74 may be connected to a different signal source and each of the segments of commutator 75 can be connected to terminate identification tones on different transmission lines. Drum 60 is capable of storing a binary number for each of the transmission lines and hence the circuit may be used to simultaneously time identification tones for a large plurality of lines. Furthermore, the timing interval may be easily and rapidly changed by inverting circuit 11 to accommodate variations in the transmission characteristics of line 79 or in other portions of the transmission system.

Magnetic drum 60 may be replaced by a plurality of delay loops and commutator 74 and 75 may be replaced by electric commutators if the mechanical elements are incapable of operating at the desired speeds. Thus, for example, clock source 70 may provide pulses with a one microsecond period and the timing intervals may be on the order of only a few microseconds. When operating at such speeds, it may become inconvenient to vary the advancing number by the manual setting of the reversing switches in inverting circuit 11. This operation may, however, be accomplished electronically by means of a plurality of circuits such as that shown in FIG. 3.

In FIG. 3 there is shown a circuit arrangement for selectively inverting a digit appearing on input conductors 90 and 91 in accordance with the digit appearing on control conductors 92 and 93. If the digit input on conductors 90 and 91 represent the resetting voltages for one digit of the advancing circuit of FIG. 1, then the binary digit appearing on control conductors 92 and 93 will serve to produce an output digit on output conductors 94 and 95 which is selectively inverted with respect to the input on conductors 90 and 91. That is, if the input to control conductors 92 and 93 is a binary "0," the output on conductors 94 and 95 will be identical to the input on conductors 90 and 91. This is apparent when it is noted that a signal on lead 92, representing the "0" input condition, enables gates 96 and 97 and thus passes the signal condition on conductors 90 and 91 to OR gates 98 and 99, respectively. When thus energized, OR gates 98 and 99 will produce on output conductors 94 and 95 the same signal conditions originally appearing on conductors 90 and 91.

If on the other hand, the control digit is a "1," a signal will appear on lead 93, enabling AND gates 100 and 101 and inverting the digits appearing on input conductors 90 and 91. That is, the signal condition on lead 90 is applied by way of AND gate 100 and OR gate 99 to output lead 95. Similarly, the signal condition on input lead 91 is applied by way of AND gate 101 and OR gate 98 to output conductor 94. In this way, the input to the circuit of FIG. 3 is selectively inverted in accordance with the binary digit appearing on control conductors 92 and 93.

In the circuit of FIG. 1, each of the reversing switches 51 through 55 may be replaced by a circuit such as that shown in FIG. 3. Rather than manually throwing switches then, the selective inversion of the presetting voltages may be accomplished by the application of the advancing number to the control conductors of the electronic inverting circuits. In this way the advancing number may be changed extremely rapidly simply by altering the signal permutations applied to these control conductors.

It will be apparent that the arrangements of the present invention are suitable for timing a wide variety of operations other than the identification tone signals in a time assignment speech interpolation system. Indeed, for any applicaion in which it is desired to simultaneously time a plurality of operations, the initiation of which are evidenced by electrical signals, the circuit of FIG. 2 would prove suitable. This circuit will time all of the operations simultaneously even though the operations may be overlapping in time.

It is to be understood that the above-described arrangements are merely illustrative of a small number of the many possible applications of the principles of the inventon. Numerous and varied other arrangements in accordance with these principles may readily be devised by those skilled in the art without departing from the spirit and scope of the invention.

What is claimed is:

1. In combination, binary counting means including means for producing two-valued signal conditions representative of all output digits substantially simultaneously on a plurality of parallel output conductors, means for selectively inverting said output, a plurality of coincidence circuits equal in number to said output digits and corresponding thereto, means for applying each of said selectively inverted signal conditions to the corresponding one of said coincidence circuits and to all of said coincidence circuits corresponding to digits of higher significance, and means for producng binary signal conditions in accordance with the outputs of said coincidence circuits, thereby to provide binary output numbers selectively advanced with respect to the output numbers from said binary counting circuit means.

2. A binary count advancing circuit comprising, a plurality of binary digit conductors, means for applying voltage conditions representative of a sequence of binary digits to each of said conductors to form a parallel sequence of binary numbers on said digit conductors, means for selectively inverting the voltage condition on each of said digit conductors, a coincidence gate corresponding to each of said digit conductors, means for applying the voltage condition on each of said conductors to the corresponding coincidence gate and to all of said coincidence gates corresponding to digit conductors carrying voltage conditions representative of binary digits of higher significance than said corresponding conductor.

3. The binary count advancing circuit according to claim 2 further including a bistable device connected to each of said coincidence gates, and means for setting each of said bistable devices in one stable condition in response to a coincidence of inputs to the connected one of said gates.

4. The binary count advancing circuit according to claim 2 wherein said selective inverting means comprises a plurality of manual reversing switches, one for each of said digit conductors.

5. The binary count advancing circuit according to claim 2 wherein said selective inverting means comprises a plurality of electronic inverting circuits, one for each of said digit conductors, each of said electronic inverting circuits comprising a plurality of coincidence gates controlled by the application of binary digit pulses.

6. Means for simultaneously timing a plurality of overlapping operations comprising recycling binary counting means, means for storing only selected ones of the output numbers from said counting means, each of said stored numbers being selected at the beginning of a respective one of said operations, means for selectively advancing said binary numbers, means for comparing said advanced numbers with each of said stored numbers, and means responsive to coincidences between said advanced numbers and each of said stored numbers for terminating the respective ones of said operations.

7. Timing means according to claim 6 further including means for erasing each of said stored numbers after it coincides with one of said advanced numbers.

8. Timing means according to claim 6 wherein said selective advancing means comprises means for selectively invert'ng said output numbers from said counting means, a plurality of coincidence-determining circuits corresponding to the digits of said output numbers, means for applying each digit of said output numbers to the corresponding coincidence-determining circuit and to all of said coincidence-determining circuits corresponding to digits of higher significance than said corresponding digit.

9. Timing means according to claim 6 wherein said storing means comprises a re-entrant storage medium capable of simultaneously storing a plurality of binary digits of equal significance but of different binary numbers.

10. Means for adding any number greater than zero to a binary number which appears as a permutation of voltage conditions on a plurality of digit conductors, which means comprises, means for selectively inverting the voltage condition on each of said digit conductors, a plurality of coincidence gates, one corresponding to each of said digit conductors, means for applying each of said selectively inverted voltage conditions to the corresponding one of said coincidence gates and to the ones of said coincidence gates corresponding to digit conductors carrying digit representations of higher significance than said corresponding digit conductor, and means for providing an output on each of said coincidence gates when a given voltage condition is applied to all of its inputs.

11. The adding means according to claim 10 further including means for selectively inverting the voltage conditions on said digit conductors in accordance with the permutations of a binary code group representing the number to be added.

References Cited in the file of this patent

UNITED STATES PATENTS

| | | |
|---|---|---|
| 2,806,947 | MacKnight | Sept. 17, 1957 |
| 2,889,987 | Marcus et al. | June 9, 1959 |

OTHER REFERENCES

Cohen: A Formal Procedure for the Logical Design of an Optimum Binary Counter, Proceedings of the National Electronics Conference, 1954, pp. 523–532.

Murray: A Variable Binary Scaler, IRE Transactions, Electronic Computers, June 1955, pp. 71–74.